United States Patent Office 3,458,525
Patented July 29, 1969

3,458,525
SPIRO(INDOLINE-3,2'-THIAZOLIDINE)-2-ONE
AND DERIVATIVES
Milton Wolf, West Chester, and Albert A. Mascitti,
Norristown, Pa., assignors to American Home
Products Corporation, New York, N.Y., a corporation of Delaware
No Drawing. Filed July 1, 1966, Ser. No. 562,096
Int. Cl. C07d 99/06, 91/32, 27/44
U.S. Cl. 260—306.7                                  10 Claims

ABSTRACT OF THE DISCLOSURE

Novel spiro(indoline - 3,2'-thiazolidine)-2-ones, optionally substituted in the aromatic ring with alkyl, alkoxy or chloro, and in the 3'-position with chloroalkanoyl, carbamoyl, benzoyl, or halo- or alkoxy-benzoyl (I) and their acid addition salts are provided by reacting an isatin (II) with the correspondingly substituted 2-mercaptoethylamine, or, optionally, an isatin with unsubstituted 2-mercaptoethylamine and treating the product with an alkanoyl halide or a benzoyl halide. Compounds (I) and their salts are pharmacologically active as anti-inflammatory, central nervous system stimulant and cardiovascular agents.

This invention relates generally to indoline derivatives, and more particularly to spiro(indoline-3,2'-thiazolidine)-2-one and derivatives thereof, including pharmaceutically acceptable acid-addition salts thereof, having pharmacological activity.

The novel compounds included within the scope of this invention are represented by the following formula:

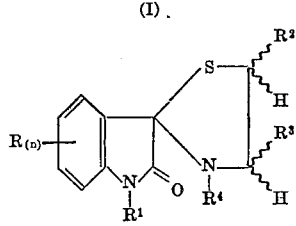

(I)

and the pharmacologically acceptable acid-addition salts thereof; wherein R is selected from the group consisting of hydrogen, alkyl, alkoxy, halogen, dialkylamino, dialkylamido, and dialkylsulfonamido; $n$ is an integer from 1 to 4; $R^1$ is selected from the group consisting of hydrogen, alkyl, aryl, arylalkyl, and heteroalkyl; and $R^2$, $R^3$ and $R^4$ are each selected from the group consisting of hydrogen, alkyl, aralkyl, alkanoyl, haloalkanoyl, carbamoyl, aroyl, alkoxyaroyl, haloaroyl, and heterocyclic.

The novel compounds of the present invention may be prepared by reacting, in a suitable inert organic solvent, (A) a compound of the group consisting of (1) isatin, and (2) the suitable derivatives thereof, with (B) a compound of the group consisting of (1) 2-mercaptoethylamine, and (2) the suitable derivatives thereof, as represented by the following reaction scheme:

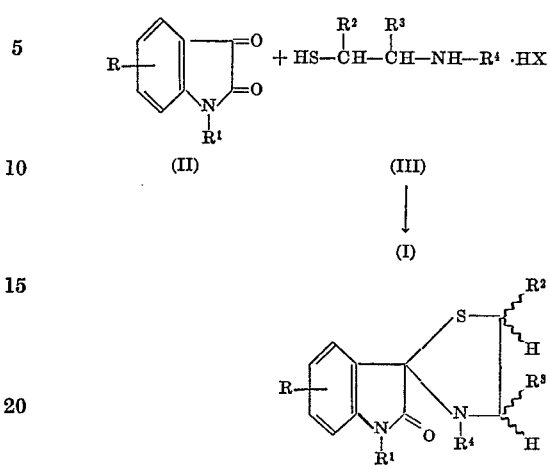

wherein R, $R^1$, $R^2$, $R^3$ and $R^4$ have the same meanings as defined with respect to Formula I above, and X is halogen. In an alternative method of preparation, particularly where the substituent $R^4$ is to be other than hydrogen, a 2-mercaptoethylamine derivative, which does not furnish said substituent, may be reacted with the selected isatin compound, and the resulting product thereafter reacted with an appropriate acid chloride.

By the term "inert organic solvent," as referred to herein, is meant any polar organic compound in which the reactants are soluble, but which does not enter into the reaction to any substantial degree. Suitable solvents, merely by way of example, are ethanol and methylene chloride.

The general conditions for the above reactions may be varied in accordance with standard procedures and dependent upon the natures of the reactants and the final product. For example, in certain instances, the inclusion in the reaction mixture of an acid acceptor, such as triethylamine, has been found to be advantageous, when the 2-mercaptoethylamine reactant has been used in the form of an acid-addition salt thereof for reasons of solubility and the base form of the compound is to be obtained.

With respect to the reactants, many of them, including isatin and beta-mercaptoethylamine, are known compounds which are readily available from commercial sources. Others, which are not commercial available, can be prepared in accordance with standard organic procedures, which are known to those skilled in the art, such as by using isatin and/or beta-mercaptoethylamine as starting materials. Either or both of said starting materials may be suitably substituted by standard procedures, prior to ultimate reaction of the thus derived reactants.

It has been discovered that compounds meeting the required qualifications of Formula I as defined above, whether as free bases or the acid-addition salts thereof, have valuable pharmacological qualities in that they function as anti-inflammatory, central nervous system stimulants (e.g. anti-reserpine) and cardiovascular agents.

As indicated above, compounds falling within the general Formula I set forth hereinbefore, may be used in the form of their acid-addition salts while still retaining their effectiveness for the stated pharmacological use. The salts may provide greater flexibility in therapeutic use since they may impart various degrees of water-solubility to an otherwise substantially insoluble base. With regard to the acid-addition salts, either organic or inorganic acids may be used for preparing them as long as said acids do not susbtantially increase the toxicity of the compound. Among the pharmaceutically-acceptable acid-addition salts considered useful for the purposes indicated, are, for example, hydrochlorides, sulphates, phosphates, hydrobromides, acetates, tartrates, propionates, sulfonates, and the like.

The acid-addition salts of the novel free bases may be prepared by procedures now well known to those skilled in the art. For example, a selected novel free base may generally be dissolved in a suitable solvent and the selected acid may then be added thereto. Since the preparation of acid-addition salts is so well known, it need not be described in any greater detail here.

When the compounds of this invention are employed as anti-inflammatory, central nervous system stimulant or cardiovascular agents; they may be administered alone or in combination with pharmacologically-acceptable carriers, the proportion of which is determined by the solubility and chemical nature of the compound selected for use, the chosen route of administration, and standard pharmaceutical practice. For example, they may be administered orally in the form of tablets, capsules or solutions, which may contain conventional excipients; or they may be injected parenterally, that is intramuscularly, intravenously, or subcutaneously. For parenteral administration, they may be used in the form of sterile solutions containing other solutes, for example, enough saline or glucose to make the solutions isotonic.

The dosage of the present therapeutic agents will vary with the form and mode of administration and the particular compound chosen. It will generally be found that when a composition comprising a compound of the invention is administered orally, a larger quantity of the active agent is required to produce the same effect as a smaller quantity thereof given parenterally. In general, the compounds of this invention are most desirably administered at a concentration level that will generally afford effective results without causing any harmful or deleterious side effects, and preferably at a level that is in the range of from about 0.5 mg. to about 100 mg. per kilogram of body weight of the subject treated per day, although as aforementioned, variations will occur. However, a dosage level that is in the range of from about 2 mg. to about 50 mg. per kilogram of body weight per day is most desirably employed in order to achieve effective results.

The following examples are given by way of illustration and are not to be construed as limitations of this invention, many variations of which are possible without departing from the scope and spirit thereof.

Example I.—Spiro(indoline-3,2'-thiazolidine)-2-one hydrochloride

A mixture of isatin (7.36 g., 0.050 m.) and β-mercaptoethylamine hydrochloride (5.68 g., 0.050 m.) in absolute ethanol (70 cc.) is refluxed for one hour, during which period a total of 35 cc. of distillate is collected via a take-off condenser. The hot solution is treated with absolute ethanol, filtered, and the product separates as almost colorless needles, 5.3 g. (43.8%), M.P. 198° dec. (uncorr.); a second crop, 3.0 g. (24.8%) M.P. 174° dec. (uncorr.) is obtained on concentrating the mother liquors. Recrystallization of the crude product from absolute ethanol affords colorless needles (7.0 g., 57.8%), M.P. 201° dec. (uncorr.) (capillary inserted at 175°; rate of heating 3° per minute).

Analysis.—Calcd. for $C_{10}H_{11}ClN_2OS$: C, 49.49; H, 4.57; N, 11.54. Found: C, 49.65; H, 4.65; N, 11.26.

Example II.—5,7-dichlorospiro(indoline-3,2'-thiazolidine)-2-one hydrochloride 5,7-dichloroisatin (65.0 g., 0.30 m.) is reacted with β-mercaptoethylamine hydrochloride (52.0 g., 0.46 m.) in absolute ethanol (1000 cc.) in a manner similar to that of Example I. The title compound is obtained as a colorless solid (46.0 g., 49.2%), M.P. indefinite.

Analysis.—Calcd. for $C_{10}H_9Cl_3N_2OS$: C, 38.54; H, 2.91; N, 8.99. Found: C, 38.82; H, 2.91; N, 9.26; Cl, 34.10.

Example III.—3'-o-chlorobenzoylspiro(indoline-3,2'-thiazolidine)-2-one

A solution of o-chlorobenzoyl chloride (1.7 g., 0.010 m.) is added dropwise with stirring to a suspension of spiro - (indoline-3,2'-thiazolidine)-2-one hydrochloride (2.42 g., 0.010 m.) in methylene chloride (70 cc.) containing triethylamine (2.0 g., 0.020 m.). After the addition is complete, the reaction mixture is stirred at ice bath temperature for 15 minutes, then at ambient temperature for one hour. The insoluble material (triethylamine hydrochloride, 0.5 g., M.P. 283–4° dec.) is separated by filtration. The filtrate is washed with water, dried over anhydrous sodium sulfate, and concentrated in vacuo. The oily residue crystallizes on the addition of ether. The crude product is recrystallized from absolute ethanol, colorless crystals (1.0 g., 29.0%) M.P. 285–6° (uncorr.).

Analysis.—Calcd. for $C_{17}H_{13}ClN_2O_2S$: C, 59.21; H, 3.79; N, 8.12; Cl, 10.28. Found: C, 59.16; H, 3.79; N, 8.39; Cl, 10.45.

Example IV.—3'-p-methoxybenzoylspiro(indoline-3,2'-thiazolidine)-2-one

Anisoyl chloride (1.7 g. 0.010 m.) is reacted with spiro (indoline-3,2'-thiazolidine)-2-one hydrochloride 2.4 g., 0.010 m.) obtained by the procedure of Example I, in a manner similar to that of Example III. The title compound is obtained from ethanol as colorless crystals (1.7 g., 50.0%), M.P. 207–8° C. (uncorr.).

Analysis.—Calcd. for $C_{18}H_{16}N_2O_3S$: C, 63.51; H, 4.73; N, 8.23. Found: C, 63.29; H, 4.82; N, 8.18.

Example V.—3'-(3,4,5-trimethoxybenzoyl)-spiro(indoline-3,2'-thiazolidine)-2-one 3,4,5-trimethoxybenzoyl chloride (3.9 g., 0.017 m.) is reacted with spiro(indoline-3,2'-thiazolidine)-2-one hydrochloride in a manner similar to the procedure of Example III. The title compound is obtained as colorless crystals from absolute ethanol, M.P. 217–18° C. (uncorr.).

Analysis.—Calcd. for $C_{20}H_{20}N_2O_5S$: C, 59.98; H, 5.03; N, 6.99. Found: C, 59.87; H, 5.38; N, 6.80.

Example VI.—3'-dichloroacetylspiro(indoline-3,2'-thiazolidine)-2-one

Utilizing the procedure of Example III, dichloroacetyl chloride (1.47 g., 0.010 m.) is reacted with spiro(indoline-3,2'-thiazolidine)-2-one hydrochloride in a manner similar to that of Example III. The title compound is obtained as colorless prisms, M.P. 245° C. dec. (uncorr.).

Analysis.—Calcd. for $C_{12}H_{10}Cl_2N_2O_2S$: C, 45.43; H, 3.18; N, 8.83; Cl, 22.36. Found: C, 45.40; H, 3.13; N, 8.84; Cl, 21.95.

Example VII.—3'-p-methoxybenzoyl-5,7-dichlorospiro(indoline-3,2'-thiazolidine)-2-one Again following the procedure of Example III, anisoyl chloride (5.1 g., 0.030 m.) is reacted with 5,7-dichlorospiro(indoline-3,2'-thiazolidine)-2-one hydrochloride (9.3 g., 0.030 m.) in a manner similar to that of Example III. The product is obtained as colorless crystals (5.0 g., 41.0%), M.P. 242–4° (uncorr.).

Analysis.—Calcd. for $C_{18}H_{24}Cl_2O_3N_2S$: C, 52.94; H, 3.20; N, 6.86; Cl, 17.36. Found: C, 52.85; H, 3.34; N, 7.04; Cl, 17.32.

Example VIII.—3'-chloroacetylspiro(indoline-3,2'-thiazolidine)-2-one

Chloroacetyl chloride (5.6 g., 0.050 m.) is reacted with spiro(indoline-3,2'-thiazolidine)-2-one hydrochloride in a manner similar to that of Example III. The title compound is obtained as colorless crystals, M.P. 218–20° dec. (uncorr.).

Analysis.—Calcd. for $C_{12}H_{11}ClN_2O_2S$: C, 50.97; H, 3.92; N, 9.91. Found: C, 50.95; H, 4.07; N, 10.14.

Example IX.—3'-carbamoylspiro(indoline-3,2'-thiazolidine)-2-one

A solution of potassium cyanate (1.62 g., 0.020 m.) in water (25 cc.) is added to a solution of spiro(indoline-3,2'-thiazolidine)-2-one hydrochloride in water (150 cc.). The product separates as a gummy solid, which crystallizes on trituration with acetone. The title compound is obtained as a colorless solid, M.P. 227° dec. (uncorr.).

Analysis.—Calcd. for $C_{11}H_{11}N_3O_2S$: C, 52.99; H, 4.44; N, 16.85. Found: C, 53.02; H, 4.47; N, 17.10.

Example X (A) Following the general procedure described in Example I, the isatin and β-mercaptoethylamine derivatives are reacted, and products of the invention obtained, as given in Table A below:

TABLE A

| Reactants | Products |
| --- | --- |
| (1) 4,5 diethylisatin and β-mercaptoethylamine hydrochloride. | 4,5 diethylspiro(indoline-3,2'-thiazolidine)-2-one hydrochloride. |
| (2) 6-ethoxyisatin and β-mercaptoethylamine hydrochloride. | 6-ethoxyspiro(indoline-3,2'-thiazolidine)-2-one hydrochloride. |

(B) Utilizing the general procedure of Example III, the acid chloride and the spiro(indoline-3,2'-thiazolidine)-2-one derivatives are reacted, and products of the invention obtained, as given in Table B below:

TABLE B

| Reactants | Products |
| --- | --- |
| (1) Benzoylchloride and spiro(indoline-3,2'-thiazolidine)-2-one hydrochloride. | 3'-benzoylspiro(indoline-3,2'-thiazolidine)-2-one hydrochloride. |
| (2) 3,4-dimethoxybenzoyl chloride and spiro(indoline-3,2'-thiazolidine)-2-one hydrochloride. | 3'-(3,4-dimethoxybenzoyl)spiro(indoline-3,2'-thiazolidine)-2-one hydrochloride. |

We claim:
1. A compound selected from the group consisting of those having the formula:

and the pharmacologically acceptable acid-addition salts thereof; wherein R is selected from the group consisting of hydrogen, lower alkyl, lower alkoxy, and chloro; $n$ is an integer from 1 to 2; and $R^4$ is selected from the group consisting of monochloro(lower)alkanoyl, dichloro(lower)alkanoyl, carbamoyl, benzoyl, chlorobenzoyl, lower alkoxybenzoyl, di(lower)alkoxybenzoyl and tri(lower)alkoxybenzoyl.

2. A compound of the group defined in claim 1, which is: spiro(indoline-3,2'-thiazolidine)-2-one hydrochloride.

3. A compound of the group defined in claim 1, which is: 5,7-dichlorospiro(indoline-3,2'-thiazolidine) - 2 - one hydrochloride.

4. A compound of the group defined in claim 1, which is: 3'-o-chlorobenzoylspiro(indoline - 3,2' - thiazolidine)-2-one.

5. A compound of the group defined in claim 1, which is: 3'-p-methoxybenzoylspiro(indoline-3,2'-thiazolidine)-2-one.

6. A compound of the group defined in claim 1, which is: 3' - (3,4,5 - trimethoxybenzoyl)-spiro(indoline-3,2'-thiazolidine)-2-one.

7. A compound of the group defined in claim 1, which is: 3' - dichloroacetylspiro(indoline-3,2'-thiazolidine)-2-one.

8. A compound of the group defined in claim 1, which is: 3' - p - methoxybenzoyl-5,7-dichlorospiro(indoline-3,2'-thiazolidine)-2-one.

9. A compound of the group defined in claim 1, which is: 3'-chloroacetylspiro(indoline-3,2'-thiazolidine)-2-one.

10. A compound of the group defined in claim 1, which is: 3'-carbamoylspiro(indoline-3,2'-thiazolidine)-2-one.

References Cited

UNITED STATES PATENTS 3,390,148   6/1968   Austin et al. _____ 260—306.7

ALEX MAZEL, Primary Examiner
R. J. GALLAGHER, Assistant Examiner

U.S. Cl. X.R.
260—325; 424—270